United States Patent [19]

Bandoli et al.

[11] Patent Number: 4,467,385

[45] Date of Patent: Aug. 21, 1984

[54] SUPPLY AND PROTECTION UNIT FOR A HERMETIC COMPRESSOR

[75] Inventors: Fulvio Bandoli; Edoardo Chiarelli, both of Turin, Italy

[73] Assignee: Aspera S.p.A., Castelnuovo Don Bosco, Italy

[21] Appl. No.: 398,467

[22] Filed: Jul. 15, 1982

[30] Foreign Application Priority Data

Aug. 7, 1981 [IT] Italy .............................. 53530/81[U]

[51] Int. Cl.³ .............................................. H02H 7/085

[52] U.S. Cl. ........................................ 361/24; 361/27; 361/22; 318/788

[58] Field of Search ........................ 361/24, 25, 26, 27, 361/28, 29, 22, 3 Y, 32; 318/782, 783, 785, 788, 791, 792

[56] References Cited

U.S. PATENT DOCUMENTS

Re. 31,367 8/1983 D'Entremont ........................ 361/27

3,141,996 7/1964 McGrath .............................. 361/24

4,237,508 12/1980 Woods et al. .......................... 361/24

4,319,299 3/1982 Woods et al. .......................... 361/24

4,387,412 6/1983 Woods et al. .......................... 361/27

*Primary Examiner*—Patrick R. Salce

*Attorney, Agent, or Firm*—Sughrue, Mion, Zinn, Macpeak and Seas

[57] ABSTRACT

A supply and protection unit for a hermetic compressor of a thermostatically regulated refrigerator comprising an electrically insulating support body (3) adapted to be fixed to the casing of the compressor (P); said support body being provided with cavities (3*a*, 3*b*, 3*c*, 3*d* and 3*e*) opening at one of its faces intended to face towards the compressor for slidably and removably inserting therein of a pair of electrical devices (1, 2) and connection means thereof to be supported against the compressor casing, one of said devices being a thermally operated protection switch (1) and the other being a resistor (2) with a positive temperature coefficient.

12 Claims, 7 Drawing Figures

SUPPLY AND PROTECTION UNIT FOR A HERMETIC COMPRESSOR

Figure 1:
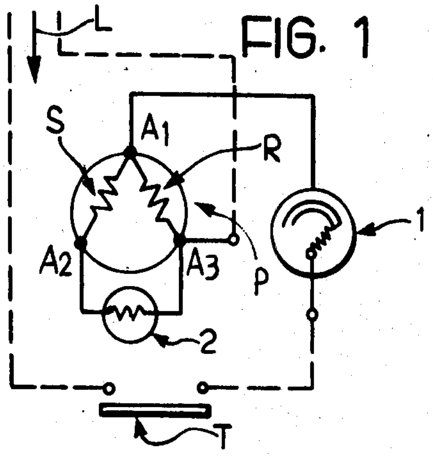

The present invention relates to supply and protection units for hermetic compressors of thermostatically regulated refrigerators.

In compressors for refrigerators according to the known art, the control and protection circuits are normally connected to a terminal board fixed to the casing of the compressor. The components of the circuits are separate from the terminal board and require wiring operations to connect them. These operations represent an item of not insignificant cost during the initial assembly of the refrigerator.

Furthermore, when one of the components of these circuits fails, it cannot be replaced easily and rapidly by a repairer and even less by a person who is not an expert.

The object of the present invention is to provide a supply and protection unit of the type specified above which is easy and rapid to assemble and easy to fix to the casing of the compressor so as to allow it to be completely or partially replaced even by a relatively inexpert repairer and without the use of special tools.

In order to achieve this object, the invention provides a supply and protection unit for a hermetic compressor of a thermostatically regulated refrigerator, characterised in that it comprises:

- an electrically insulating support body adapted to be fitted to the casing of the compressor,
- a pair of electrical devices carried by the support body one of which is a resistor with a positive temperature coefficient (PTC) and the other of which is a thermally activated protection switch, and
- connection means for connecting an electrical supply source to the windings of the electric motor of the compressor and to the control thermostat of the compressor.

Preferably the said electrical devices are slidably and removably inserted in respective cavities in the support body opening at a face of the body intended to be turned towards the compressor.

The protection switch is to advantage disposed in its cavity so that, with the body fixed to the casing, a sensitive face of this switch is applied to the casing itself.

The connection means are preferably constituted, at least in part, by shaped lamellar elements which are slidably inserted in respective cavities in the body. These cavities are separated by septa extending in the direction of sliding of the PTC resistor and of the thermally activated switch and having one edge in correspondence with the open face of the support body.

By virtue of the characteristics explained above, the supply and protection unit according to the invention may be easily and rapidly assembled by inserting the electrical devices and the connection means slidably into the cavities in the support body. After assembly, the unit may be fixed to the casing of the compressor with the sensitive face of the thermally activated switch applied against the casing itself.

The supply and protection unit according to the invention is intended to be applied preferably to a compressor from the casing of which male elements project for connection with the windings of the electric motor housed in the casing. The connection means of the unit then comprise corresponding female elements which can be fitted with interference onto the said male elements, to fix the body to the casing as well as to establish the relative electrical connections.

Figure 2:
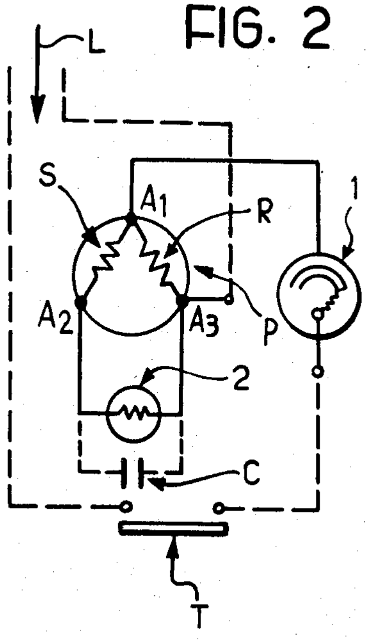
Figure 3:
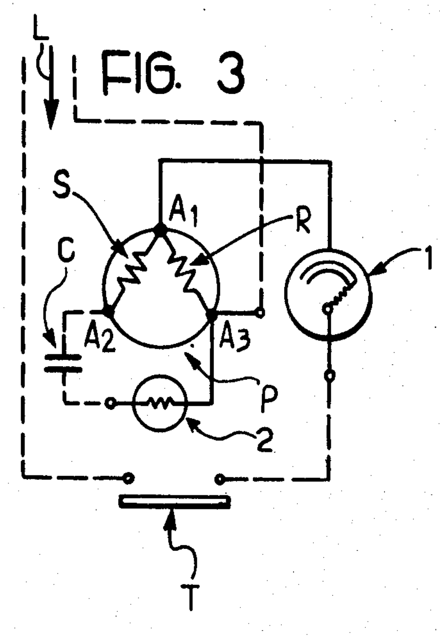
Figure 7:
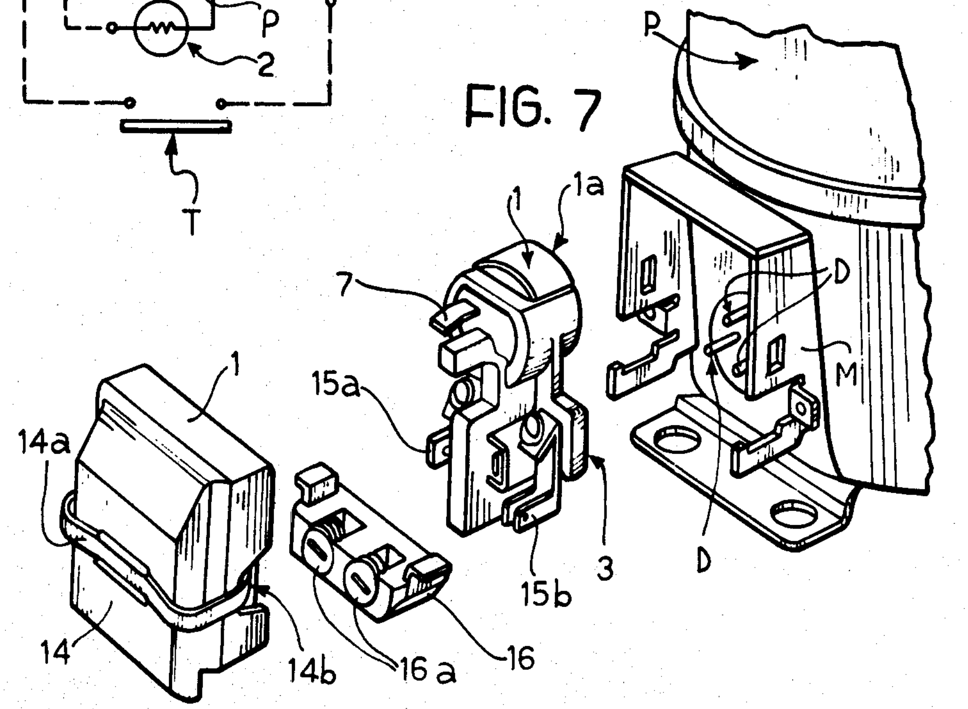
Figure 4:
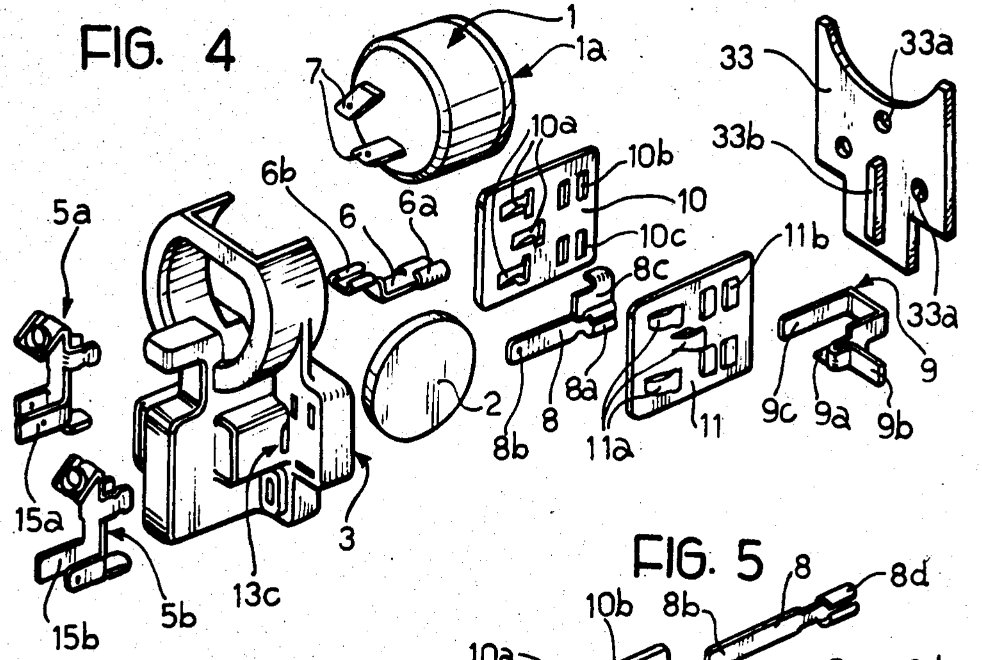
Figure 5:
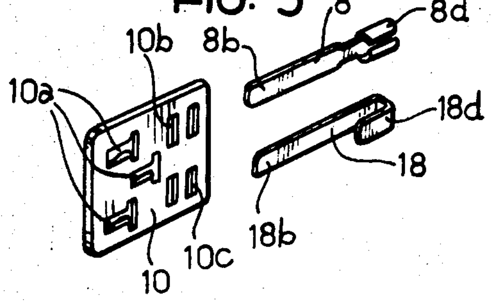
Figure 6:
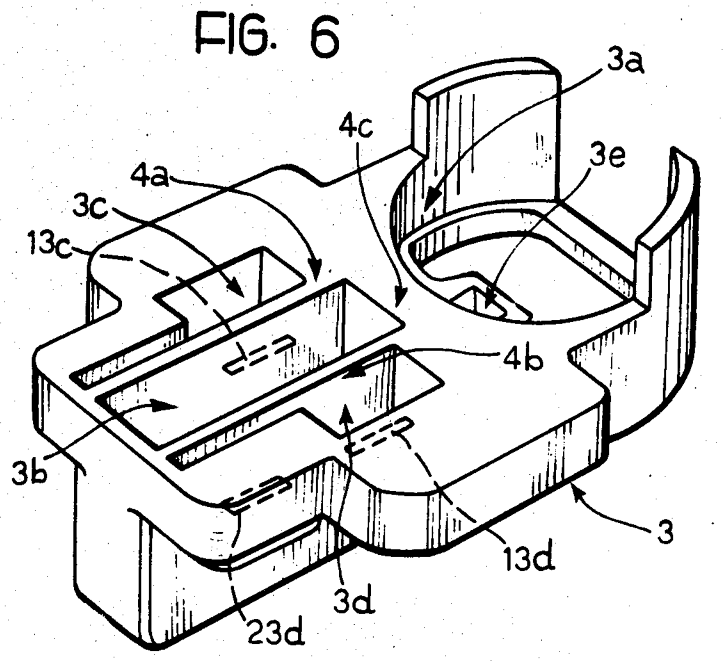

The advantages resulting from the invention will become clear from the following description, given purely by way of non-limiting example, with reference to the appended drawings in which:

FIG. 1, FIG. 2 and FIG. 3 illustrate three electrical diagrams for connecting the supply and protection unit according to the invention to an electrical compressor of a thermostatically regulated refrigerator, FIG. 4 is an exploded perspective view of the unit according to the invention, FIG. 5 is a partial view, similar to FIG. 4, illustrating several elements suitable for connection according to the diagram of FIG. 3, FIG. 6 is a view on an enlarged scale according to a different perspective of an element illustrated in FIG. 4, and FIG. 7 is a perspective view of a unit according to the invention illustrated together with several additional elements during application to the casing of a schematic compressor.

In FIGS. 1, 2, and 3 references $A_1$, $A_2$ and $A_3$ indicate first second and third electrical contacts carried by the casing of a hermetic compressor P and connected respectively as follows:

- the contact $A_1$ to a common first end of the starting winding S and of the running winding R of the motor of the compressor P,
- the contact $A_2$ to a second end of the starting winding F of the motor of the compressor P, and
- the contacts $A_3$ to a second end of the running winding R of the motor of the compressor P.

The contact $A_1$ and the contact $A_3$ are connected to an electrical supply indicated schematically by L. The connection of the contact $A_1$ to the supply L includes the interposition of a thermally activated protection switch 1 and a thermostat T intended to cut off the current supply to the compressor respectively when the temperature of the casing of the compressor exceeds a safety level or when the temperature of the compartment of the refrigerator falls below a level selected on the thermostat T.

Between the contacts $A_2$ and $A_3$ there is disposed a resistor 2 with a positive temperature coefficient (PTC) which is electrically connected in series with the starting winding S of the motor of the compressor P.

During starting of the compressor P, controlled by the thermostat T, the current supplied to the compressor P passes through the PTC resistor 2 and the starting winding S of the motor of the compressor P. The passage of the current causes, with the heating of the resistor 2, an increase in the resistance of the series connection constituted by the resistor 2 and the starting winding S of the motor of the compressor P. The passage of current through this series connection falls to a minimum value and the intensity of the current supplied to the motor of the compressor P is reduced to the sum of this minimum value and the value of the current which passes through the running winding R of the motor itself.

The electrical connection diagrams illustrated in FIGS. 2 and 3 are substantially identical to that illustrated in FIG. 1, with the single exception of the presence of a capacitor C disposed in parallel (FIG. 2) and in series (FIG. 3) respectively with the resistor 2.

As illustrated in FIGS. 4 to 7, the supply and protection unit according to the invention includes a support body 3 of electrically insulating material such as a moulded plastics material, which has a plurality of cavities *3a, 3b, 3c, 3d* and *3e* opening in its surface which faces towards the casing of the compressor P. The thermally activated protection switch 1 and the resistor 2 with the positive temperature coefficient are slidably and removably inserted in the respective cavities *3a,* and *3b* of the support body 3. The cavities *3a, 3b, 3c, 3d* and *3e,* some of which have apertures *13c, 13d, 23d* situated on their lateral and bottom walls, are separated by septa *4a, 4b* and *4c.* These septa extend in the direction of sliding of the switch 1 and the resistor 2 and have an edge in correspondence with the face of the support body 3.

The protection switch is disposed in its cavity *3a* so that, with the body 3 fixed to the casing of the compressor P a sensitive face *1a* of the switch is applied against the casing itself. The support body 3 carries two externally gripping terminals *5a, 5b* (FIG. 4), provided with screws for fixing cables for connecting to the power supply source L and lamellar contact elements *15a, 15b* for connection to the thermostat unit T and other electrical auxiliary devices of the refrigerator.

A first blade 6, which is mounted within the body 3 and is connected at one end *6a* to the contact $A_1$ of the compressor P is provided at its other end *6b* with a female element which receives slidingly one of the terminals 7 of the switch 1 within the cavity *3e.*

A second blade 8, which is supported by the body 3 and is connected at one end *8a* to the contact $A_2$ of the compressor P, is provided with a lamellar contact *8b* which projects out of the body 3 through the aperture *13d* formed in the bottom wall of the cavity *3b* (FIG. 5).

A third blade 9, which is carried by the body 3 and is connected at one end *9a* to the contact $A_3$ of the motor of the compressor P, is provided with a turned back portion *9b* which projects out of the body 3 through an aperture *13c* formed in one of the walls of the cavity *3c* and is located in contact with the terminal *5b.*

The PTC resistor 2 is in the form of a tablet with major opposed contact faces. Between these major faces and the septa *4a, 4b,* which form respective walls of the cavity *3b* in which the resistor is inserted, there are interposed plate connection elements 10, 11. These connection elements 10, 11 have spring contact tongues *10a, 11a* which resiliently engage the said major faces of the PTC resistor 2. The force exerted by the tongues *10a, 11a* presses the plate elements 10, 11 against the septa *4a, 4b* resulting in the retention by friction of these elements and of the resistor 2 sandwiched between them within the cavity *3b.*

The plate connection elements 10, 11 are formed in a substantially identical manner and are provided with tabs *10b, 11b* formed by punching which slidingly receive respective lugs *8c,* and *9c* of the blade 8 and the blade 9.

The lugs *8c* and *9c* have a U-shaped profile and embrace the septa *4a, 4b* in such a manner that each lug has two arms each of which is located in a different cavity of the body 3. In the case of the connection of FIG. 1, the blade 8 and the blade 9 ensure the electrical continuity between the contact $A_2$ and the plate connection element 10 and between the contact $A_3$ and the plate connection element 11 respectively. The opposite contact faces of the PTC resistor 2, which is sandwiched between the plate elements 10, 11 are thus connected to the contacts $A_2$ and $A_3$.

In the case of the connection of FIG. 2, a connector connected to one of the plates of the capacitor C (not illustrated) may be engaged by sliding on the contact *8b* of the blade 8. The other plate of the capacitor C may be connected to the terminal *5b* through a respective connector coupled to one of the contact elements *15b.*

In the case of the connection of FIG. 3, the blade 8 does not have the lug *8c* and the plate element 10 carries a profiled blade 18 which is engaged slidably between the respective tabs *10c* formed by punching, and which has an end portion *18a* which is U-shaped and embraces the septum *4b* tightly. At the opposite end, the profiled blade 18 carries a lamellar contact *18b* which projects out from the body 3 through the aperture *23d* formed in the bottom wall of the cavity *3d.*

The plate element 10 is connected to the contact $A_2$ through a capacitor C (not illustrated) the plates of which are connected to connectors joined respectively to the lamellar contact *8b* and to the lamellar contact *18b.*

As illustrated in FIGS. 4 and 5, the plate connecting elements 10 and 11, although being intended to be connected in a different manner to the other elements of the unit, are preferably formed in an identical shape to simplify the assembly operations for the device.

Similarly, the body 3 may to advantage be formed with a structure which is symmetrical about the median longitudinal plane of the cavity *3b* and with a symmetrical distribution of the apertures formed in the walls of the cavities *3c, 3d.*

The unit illustrated is intended for application to a casing of a compressor P in which the contacts $A_1$, $A_2$ and $A_3$ are constituted (FIG. 7) by male connecting elements in the form of projecting pins D. The end *6a* of the first blade 6, the end *8a* of the blade 8 and the end *9a* of the blade 9 are formed as female elements which can fit with interference onto the pins D to allow (FIG. 7) the fixing of the support body 3 to the casing of the compressor P as well as forming the relative electrical connections.

A plate 33 is fitted to the support body 3 to close the mouths of the cavities *3b, 3c* and *3d* and has apertures *33a* for the passage of the pins D. The plate 33 also has a projection *33b* which projects inwardly of the cavity *3b* to allow the correct positioning of the resistor 2 in this cavity.

The unit illustrated further comprises a half shell lid 14 for covering the body 3; the lid 14 has a peripheral wall able to surround a corresponding enclosure wall M of the casing of the compressor P.

The lid 14 is provided with a C-shaped spring strap *14a* which embraces the lid 14 and has ends *14b* bent towards each other and which are engageable in corresponding apertures of the enclosure wall M.

The lid 14 may also include a small bridge 16 which is intended to be supported by respective brackets formed in the enclosure wall M and is provided with apertures for the passage of cables for connection to the electrical supply L and screws *16a* for preventing the sliding of these cables and their detachment from the terminals *5a* and *5b.*

Naturally, the effect of the present model extends to models which achieve equal utility by using the same innovative concept.

We claim:

1. A supply and protection unit for connecting to an electrical power supply source the windings of an electric motor of a hermetic compressor of a refrigerator, a control thermostat being interposed between said windings for regulating the supply of power, said unit comprising:

an electrically insulating support body adapted to be fixed to the casing of the compressor, said support body being provided with cavities opening at one of its faces intended to face towards the compressor casing, a first and second electrical device slidably and removably inserted in a first one and a second one of said cavities, respectively; said first device being a thermally operated protection switch and said second device being a resistor with a positive temperature coefficient (PTC), wherein the protection switch is disposed in said first cavity so that, with the body fixed to the compressor casing, a heat sensitive face of the switch is applied to the casing itself, and connection means for the electrical connection of an electrical power supply source to said windings of the electric motor of the compressor and to said control thermostat of the compressor.

2. A unit according to claim 1, wherein the said connection means are constituted at least in part by shaped lamellar elements which are inserted slidably in respective cavities of the support body.

3. A unit according to claim 2, wherein the cavities of the support body are separated by septa extending in the direction of sliding the switch and of the resistor and having an edge in correspondence with the open face of the body and at least some of the lamellar elements are U-shaped so as to embrace a respective one of the septa and present two arms situated each in a respective cavity.

4. A unit according to claim 3, wherein at least one of the U-shaped lamellar elements is pinched between a septum and the thermally operated switch and the PTC resistor.

5. A unit according to claim 3, wherein at least one of the U-shaped lamellar elements tightly embraces one of the septa.

6. A unit according to claim 3, wherein the PTC resistor is in the form of a tablet with major opposed contact faces and in that the lamellar elements for connection to the resistor comprise plate-like parts interposed between the said major faces and the septa forming the respective walls of the cavity in which the resistor is inserted; said plate-like parts being provided with integrally formed spring contact tongues which resiliently engage the said major faces and by means of which the plate-like parts are held against the said walls.

7. A unit according to claim 6, wherein the plate-like parts have integral tabs formed by punching which slidably receive respective arms of the U-shaped lamellar elements.

8. A unit according to claim 1, wherein a plate is fitted on the support body to close the opening of some cavities with the exception of that containing the thermal switch this plate having apertures for the passage of elements for connection to the windings of the electric motor housed in the casing of the compressor.

9. Unit according to claim 1 intended for mounting on a compressor from the casing of which male elements project for connection with the windings of the electric motor housed in the casing, wherein the connection means include female elements which can be fitted with interference onto the said male elements to fix the body to the casing as well as to establish the relative electrical connections.

10. Unit according to claim 1 including a half-shell lid for covering the body, this lid being provided with a peripheral wall the edge of which can be fitted to the casing of the compressor.

11. Unit according to claim 10, wherein the peripheral wall of the lid is arranged to surround a corresponding enclosure wall carried by the casing of the compressor and the lid is provided with means for fixing it to this wall.

12. Unit according to claim 11, wherein the fixing means comprises a C-shaped spring strip which embraces the lid and which has ends bent towards each other and engageable in corresponding apertures of the enclosure wall.

* * * * *